United States Patent Office 3,475,257
Patented Oct. 28, 1969

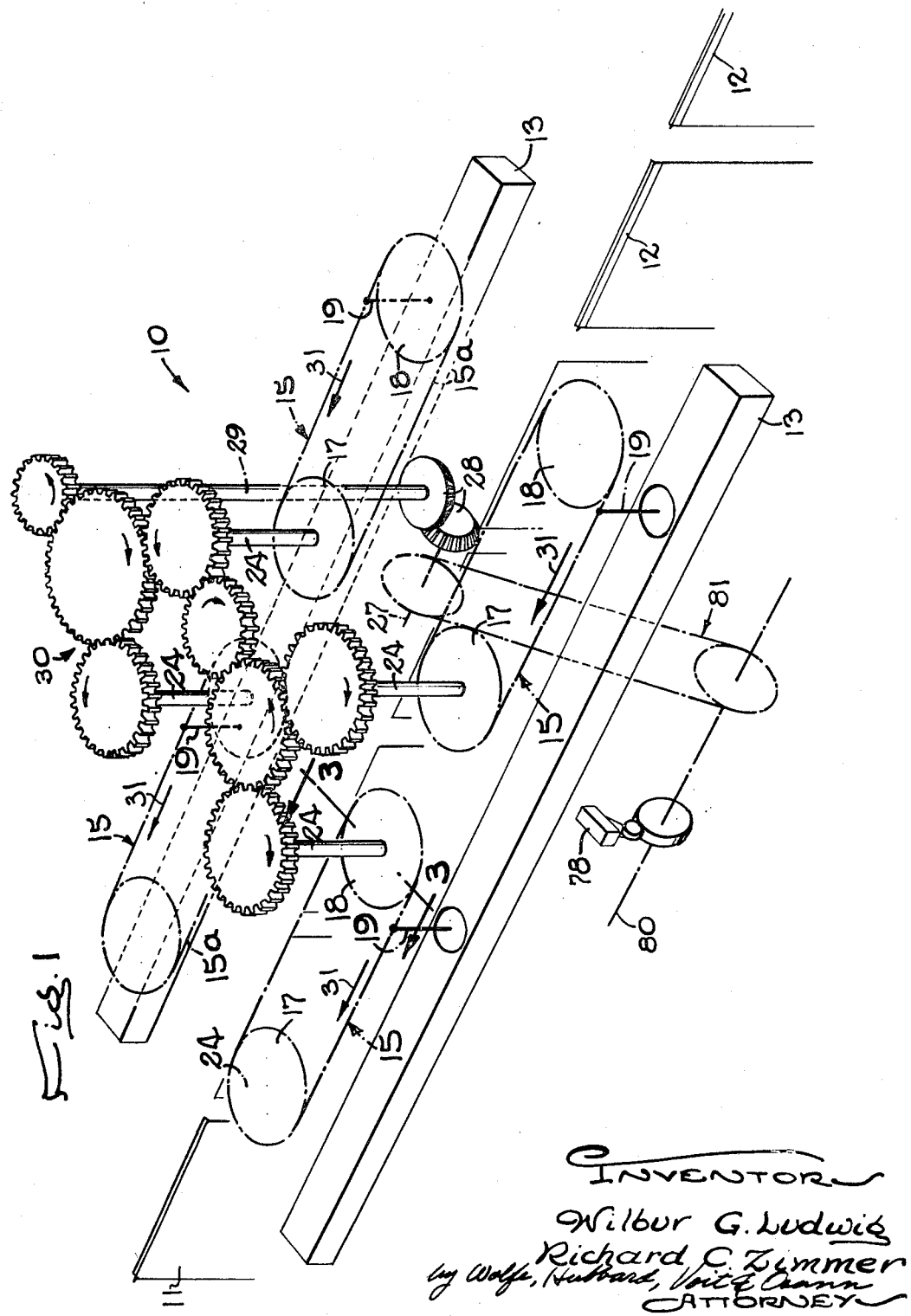

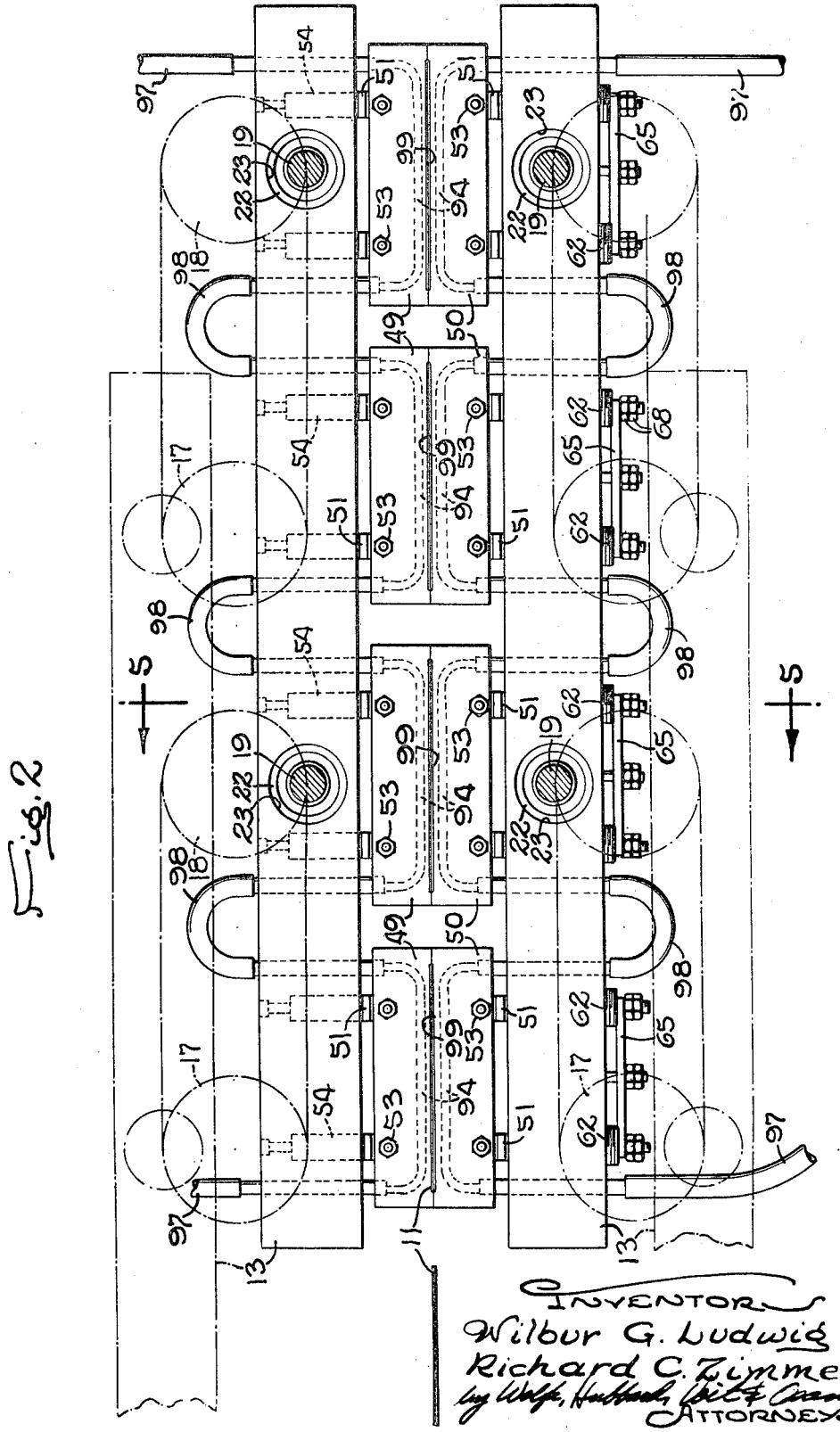

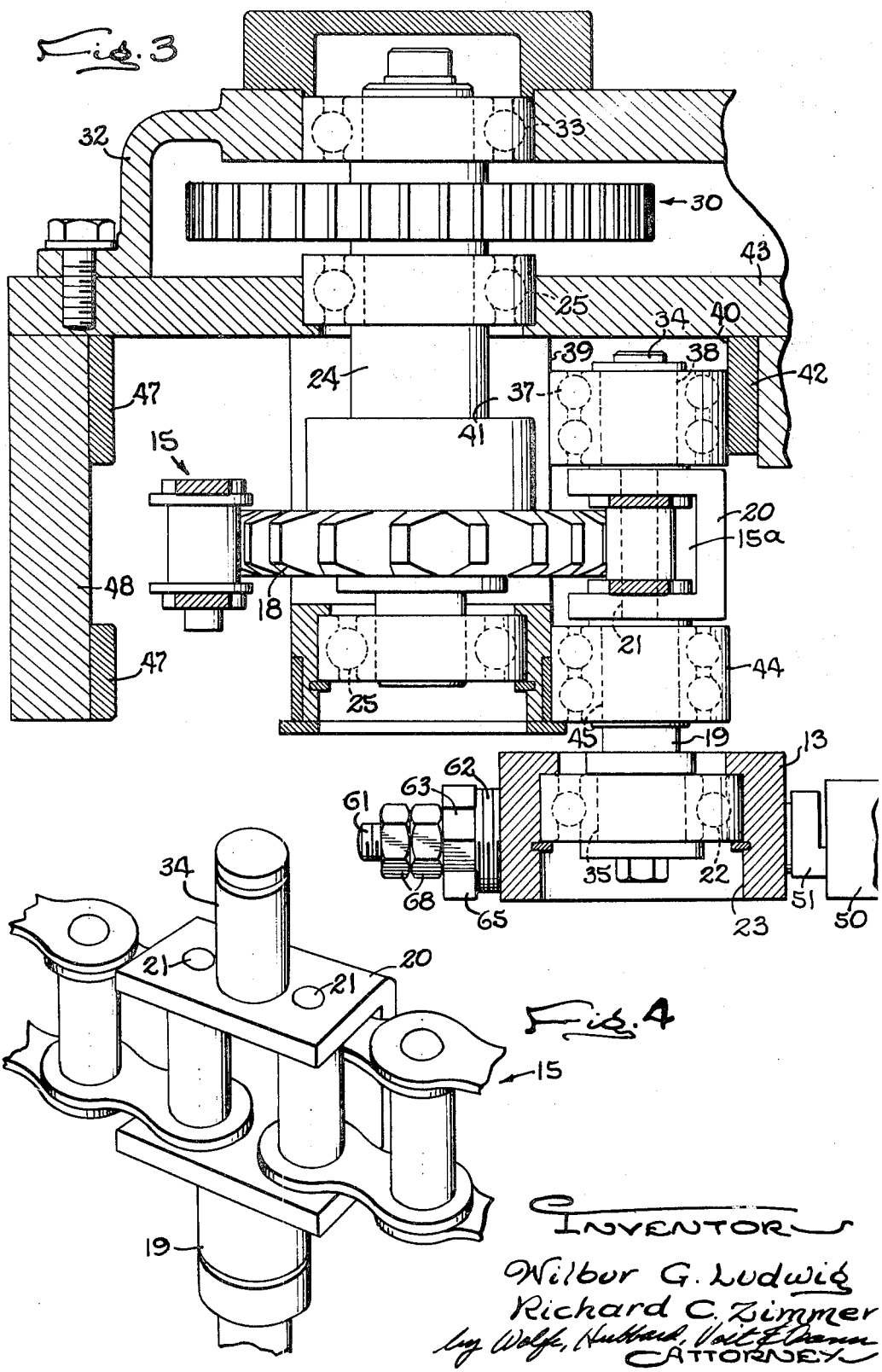

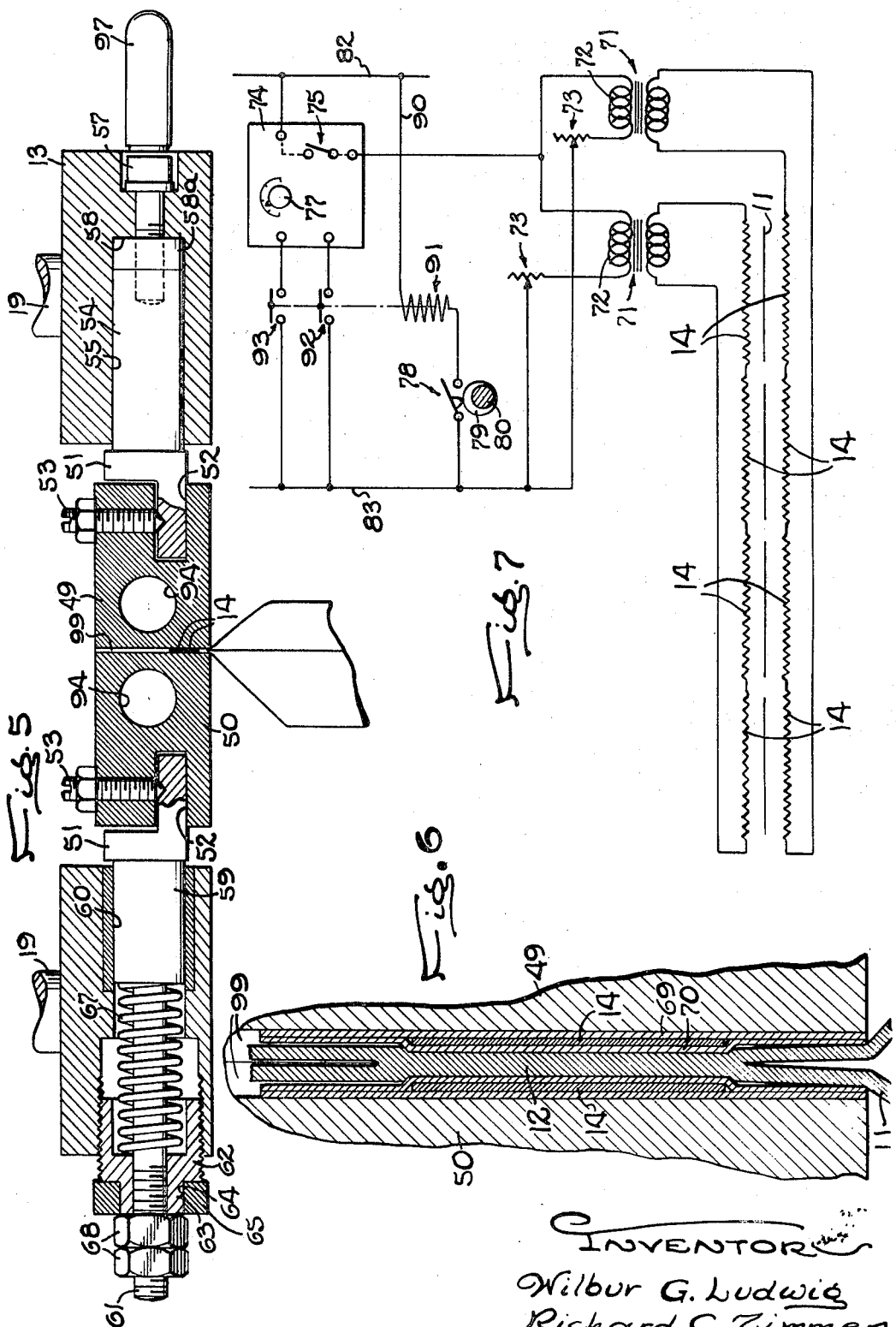

3,475,257
HEAT SEALING MECHANISM
Wilbur G. Ludwig and Richard C. Zimmer, Rockford, Ill., assignors to Riegel Paper Corporation, Rockford, Ill., a corporation of Delaware
Filed Dec. 5, 1966, Ser. No. 599,120
Int. Cl. B32b 31/04; B30b 15/34
U.S. Cl. 156—498
13 Claims

ABSTRACT OF THE DISCLOSURE

A heat sealing mechanism in which elongated support bars are disposed on opposite sides of the path of a succession of bags and are supported for orbital movement in parallel relation along endless paths such that opposed sealing elements on the bars are moved into pressing engagement with areas of the bags between the bars, and then are moved along the bag path with the bags. The sealing elements are resistance heating elements that are energized momentarily to melt the thermoplastic material of the bags, and then are cooled quickly by circulated coolant to solidify the seals before the bags are released.

BACKGROUND OF THE INVENTION

This invention relates to heat sealing mechanisms generally and, more particularly, to a mechanism for sealing unsupported sheets or strips of thermoplastic packaging material such as polyethylene. It is common practice to seal such sheets by pressing them together, heating them to the melting temperature of the material and then permitting the sheets to cool with their adjacent sides fused together. When working at high speeds and with thin and flimsy material, the melted plastic in the seal areas lacks any real strength and thus tends to flow or pull apart if unsupported until the seal has cooled.

SUMMARY OF THE INVENTION

The general object of this invention is to provide a novel sealing mechanism capable of heat sealing thin and unsupported thermoplastic materials moving through the machine at a rapid rate for high-speed package production. For this purpose, the mechanism heats the seal areas rapidly to the melting temperature of the thermoplastic material with a momentary impulse of heat, and then, before releasing the sheets, immediately cools the seal area to solidify the plastic at the seal before it can flow or pull apart. The sealing elements also are mounted to apply proper sealing pressure without danger of pressing through thin material while the latter is melted.

BRIEF DESCRIPTION OF THE DRAWINGS

FIG. 1 is a schematic perspective view of a heat sealing mechanism embodying the novel features of the present invention.

FIG. 2 is a plan view showing the primary elements of the mechanism with the sealing elements in engagement with a group of four bags to be sealed.

FIG. 3 is an enlarged fragmentary cross-sectional view taken in a vertical plane through one of the heat sealing units, substantially along the line 3—3 of FIG. 1.

FIG. 4 is an enlarged fragmentary perspective view of parts shown in part in FIG. 3.

FIG. 5 is an enlarged fragmentary sectional view taken substantially along the line 5—5 of FIG. 2.

FIG. 6 is a greatly enlarged sectional view similar to part of FIG. 5 and showing the manner of engagement of the sealing elements with the bags.

FIG. 7 is a schematic electrical diagram showing a typical electrical circuit and the control components for the heating elements.

DETAILED DESCRIPTION

As shown in the drawings for purposes of illustration, the invention is embodied in a heat sealing mechanism 10 for use in a packaging machine to seal open-ended bags 11 as the latter are advanced edgewise through the machine by a suitable carrier (not shown) moving from left to right as viewed in FIGS. 1 and 2. The illustrative bags comprise two side-by-side rectangular sheets of suitable material such as polyethylene which are joined together along their bottom and side edges prior to filling and then are sealed closed at 12 to complete the packaging operation.

In this instance, the bags 11 move continuously through the machine and the heat sealing mechanism 10 is of the general type disclosed in Patent No. 3,230,687 in which two heat sealing units are disposed on opposite sides of the bag path with two elongated support bars 13 carrying the sealing elements 14 (FIGS. 5–7) for a group of bags and mounted for movement along orbital paths while remaining parallel to the bag path. For this purpose, each bar is carried by two endless chains 15 spaced apart longitudinally of the bag path and trained around pairs of longitudinally spaced sprocket wheels 17 and 18 which support the two chains with alined, elongated straight runs 15$^a$ of the chains parallel to the bag path. Each chain carries a vertical pivot shaft 19, herein depending from a C-shaped bracket 20 (FIGS. 3 and 4) fastened at 21 to the chain, and each support bar is mounted on the pivot shafts of the two chains on one side of the bag path by means of anti-friction bearings 22 journaled on the lower end portions of the shafts and fixed in cylindrical recesses 23 spaced apart longitudinally of the bar.

The two sprocket wheels 17 and 18 supporting each chain 15 are fast on vertical shafts 24 (FIG. 1) that are journaled on the machine frame in spaced bearings 25, as illustrated in FIG. 3, disposed above and below the sprocket wheel. One shaft of each chain is driven by a drive shaft 27 through bevel gears 28, a vertical intermediate shaft 29, and gearing as shown at 30 at the upper ends of the four shafts 24 at the adjacent ends of the four chains 15. All of the chains are driven in unison in the direction indicated by the arrows 31. A gear case 32 (FIG. 3) covers this gearing and supports a third bearing 33 for each of the driven shafts.

As shown most clearly in FIGS. 3 and 4, the C-shaped bracket 20 on each chain 15 is fastened to two links of the chain with the pivot shaft 19 depending from the lower leg of the bracket and with a second coaxial shaft 34 upstanding from the bracket. The bar-supporting bearing 22 is journaled on a spool 35 on the pivot shaft and another bearing 37 is journaled on a spool 38 on the upper shaft to form a roller guide cooperating with parallel tracks 39 and 40 on the frame to control the position of the support bar along the active runs 15$^a$ of the chains. Herein, the outer track 39 is formed by the inner side of an elongated guide block 41 between the two runs of each chain and the inner track 40 is the outer side of a rail 42, both the block and the rail being supported on the underside of a horizontal frame plate 43 overlying the chain. A similar lower roller guide 44 journaled on a spool 45 on the pivot shaft between the support bar 13 and the chain, rides along the lower portion of the guide block to complete the bracing of the chain. Along the return run of each chain, the two roller guides ride between the outer side of the guide block and two rails 47 on a plate 48 depending from the outer edge of the horizontal frame plate. The upper bearing 25 is mounted on the frame plate 43 and the lower bearing is on the guide block 41.

The sealing elements 14 herein are carried on the adjacent sides of opposed pairs of sealing bars 49 and 50 spaced apart longitudinally of the support bars and mounted on the adjacent or inner sides thereof as shown most clearly in FIGS. 2 and 5. Preferably, each sealing bar 49 is rigidly mounted on its support bar by means of two L-shaped brackets 51 fitted into recesses or a groove 52 in the outer side of the bar and secured to the bar by set screws 53. The brackets are formed with necks 54 projecting into bores 55 in the support bar and held in place by cap screws 57 threaded into the necks through the outer end walls 58 of the bores and also through spacers 59 which draw the necks tightly against the spacers.

On the other support bar 13, the sealing bars 50 are identical to the bars 49 but preferably are yieldably mounted and spring-urged inwardly toward the bag path for resilient engagement with the bags 11 and the opposed sealing bars. For this purpose, each bar 50 is secured to two of the L-shaped brackets 52 by set screws 53 and the necks 59 on these brackets extend loosely into bores 60 in the support bar with an elongated stud 61 on the outer end of the neck projecting on through the support bar and loosely through a sleeve or plug 62 threaded into the outer end of the bore. Each plug has a square head 63 fitting into a notch 64 in the end of a tie-bar 65 fastened to the outer side of the support bar to prevent inadvertent turning of the plugs. A coiled spring 67 is compressed between the plug and the outer end of the neck to urge the latter inwardly toward the bag path, and two lock nuts 68 are threaded onto the outer end portion of the stud to limit such inward motion.

It will be seen that the nuts 68 on the studs 61 may be adjusted to vary the preloading of the springs 67, thus varying the force resisting yielding of the sealing bars 50, and the plugs 62 may be adjusted in and out (with the two tie-bars removed, of course) to vary the spacing of the sealing bars from the inner side of the support bar 13 for proper engagement of the sealing elements 14 with the bags.

With the foregoing arrangement, movement of the four chains 15 about their endless paths causes the support bars 13 to follow similar paths, moving the bars together as the pivots 19 move around the left or upstream sprocket wheel 17 of each chain, and then endwise along the bag path with the sealing elements 14 in engagement with the group of bags 11 clamped between the support bars. As the pivots move around the right sprocket wheels 18 of the chains, the bars are shifted away from the bar path to release the sealed bags. Finally, the support bars are moved reversely along the bag path, in spaced relation therewith, and returned to their upstream positions as the pivots move along the return runs of the chains and again move around the upstream sprocket wheels. The bag carrier also may be of a type disclosed in the aforesaid patent.

Certain materials such as thin strips or sheets of polyethylene are difficult to heat seal in the absence of some special backing or support such as pouch paper. When heated to a temperature sufficient to fuse the adjacent surfaces of two sheets together, the seal areas lack sufficient rigidity or body to sustain themselves and tend to come apart before they can be cooled and solidified. Moreover, the problems of heat sealing such materials are particularly difficult to overcome in high-speed packaging machines where available time is quite limited.

In accordance with the present invention, the sealing elements 14 are energized or heated only momentarily while in engagement with the opposite sides of a bag 11 and then are cooled immediately to solidify the melted plastic and complete the seal 12 before the plastic can flow. To these ends, the heating elements are thin strips of resistance-heating material, such as Nichrome, capable of generating heat at a rapid rate and concentrating this heat at the point of use, and the sealing bars 49, 50 carrying the heating elements are continuously cooled to prevent any accumulation of stored heat and to chill the heating strips as soon as they are deenergized. Thus, the seal areas of the thin sheets are heated rapidly to the melting point and then cooled almost instantly to solidify the plastic and complete the seals.

It will be seen in FIGS. 5 and 6 that the heating strips 14 are positioned on the adjacent faces of the sealing bars 49, 50 near the lower edges thereof and are sandwiched between a facing sheet 69 such as silicon rubber cemented to the sealing bar and a second sheet 70 of heat conducting, anti-stick material such as that sold by Du Pont under the trademark Teflon, the Teflon sheet being cemented to the rubber sheet around the heating strip. The length and width of the heating strips themselves are the same as the length and width of the seals to be formed, and the thickness of the strip is as small as is practical, for example, a few thousandths of an inch. It will be apparent that the sheets of Teflon will transmit heat from the Nichrome strips directly and rapidly to the area of the bags clamped between the strips when the latter are energized, and will conduct heat rapidly back through the strips to the cooled sealing bars 49, 50 as soon as the strips are deenergized.

In the typical control circuitry shown in FIG. 7, the two groups of heating strips 14 on the support bars 13 are series-connected across the output terminals of two transformers 71, the two transformers having input coils 72 energized through selectively variable resistors 73 for setting the heating rate. The length of the heating impulse is controlled by a timer 74 of well known construction and operation having a switch 75 in the circuits of the transformers for energizing the latter and the heating strips 14 when the switch is closed. The length of the timed interval is preselected with a control knob 77 and herein is on the order of 0.2 of a second, the timer preferably being adjustable for intervals between 0.1 of a second and 1.0 second and being of the automatic reset type.

To initiate the heating impulse when the bags 11 have been clamped between the sealing bars 13, a switch 78 (FIGS. 1 and 7) is opened and closed in timed relation with the movements of the support bars by a cam 79 on a camshaft 80 driven by a chain-and-sprocket connection 81 with the drive shaft 27 for the chains 15. By proper selection of drive ratios, the camshaft is turned through one revolution during each cycle of the chains and support bars, closing the switch 78 when the bags are ready to be sealed and opening the switch after the sealing operation is completed.

As will be seen in FIG. 7, closing of switch 78 completes an energizing circuit across the power lines 82 and 83 through a line 90 and a relay 91 which, when energized, closes its switches 92 and 93 to complete energizing circuits for the timer 74. The timer then closes its switch 75 to energize the transformers 71 and the heating strips 14. The resulting pulse of current through the heating strips is terminated by opening of the switch 75 when the timer times out after the predetermined time interval, and the relay 91 then is deenergized by opening of the cam-operated switch 78 preparatory to the next sealing operation, and this opens switches 92 and 93 to deenergize the timer.

Continuous cooling of the sealing bars 49, 50 is accomplished by circulating a coolant such as cold water through the bars close to the heating strips 14, herein through U-shaped conduits 94 (see FIGS. 2 and 5) formed in the bars and communicating with flow tubes 95 extending through the support bars 13. The flow tubes at each end of the support bar communicate with flexible supply and return hoses 97 while the intermediate tubes are series-connected by hoses 98 to carry a continuous flow of coolant along the support bar and through each sealing bar.

To limit and control the sealing pressure applied to each bag 11, the adjacent faces of the sealing bars 49, 50 are recessed at 99, as shown most clearly in FIGS. 2 and 6, to receive the bag between opposed longitudinally spaced lands or flats at the ends of the seal bars. These flats abut against each other and prevent the sealing elements from pressing through the heated plastic, thus setting the spacing of the heating elements 14 when the sealing bars are together. It will be seen in FIG. 6 that the spacing of the adjacent sides of the sealing elements (the sheets 70) is less than the normal thickness of the sheets so that the heating elements press into the sheets to a limited extent but cannot press through the sheets.

We claim as our invention:

1. Mechanism for heat sealing bags composed of thermoplastic material and advancing in edge-to-edge relation along a predetermined path, said mechanism having, in combination, a pair of elongated support bars disposed in spaced parallel relation on opposite sides of said path, opposed sealing bars spaced apart longitudinally of each support bar and on the adjacent sides of the support bars, heating elements in the form of elongated strips of resistance-heating material carried on said sealing bars in opposed relation for engagement with the opposite sides of bags between said sealing bars, means for passing current through said heating strips for a preselected time interval sufficient to melt the material between said strips and then terminating the current while the strips remain in engagement with said bags, and means for cooling said strips while the latter are in engagement with the bags to solidify the heated portion of the bags before releasing the same.

2. Mechanism as defined in claim 1 further including a sheet of anti-stick heat conducting material covering each heating strip.

3. Mechanism as defined in claim 1 in which adjacent faces of said sealing bars are formed with recesses for receiving the bags, said heating elements being disposed in said recesses and spaced apart, when said adjacent faces are together, a distance less than the normal thickness of said sheets to apply a preselected sealing pressure.

4. Mechanism as defined in claim 1 in which said cooling means includes conduits formed in said sealing bars and extending along said strips to carry a flow of coolant through the bars.

5. Mechanism as defined in claim 1 in which said current-passing means includes a timer for completing an energizing circuit through each of said strips and breaking said circuit after a preselected time interval.

6. Mechanism as defined in claim 5 further including means operating in timed relation with the movement of said support bars to initiate heating and timing of said interval after said strips are in engagement with the bags.

7. Mechanism as defined in claim 5 in which said timer is adjustable to provide timed intervals of current flow, ranging from approximately 0.1 of a second.

8. Mechanism for heat sealing side-by-side sheets of thermoplastic material moving along a predetermined path, said mechanism having, in combination, a pair of elongated support bars disposed in spaced parallel relation on opposite sides of said path, opposed sealing elements carried on the adjacent sides of said bars, means supporting said bars for movement in unison along endless paths each having an elongated run extending along said predetermined path whereby the bars first move toward each other to bring said elements into pressing engagement with said sheets, then endwise along said predetermined path with said sheets, and then away from the sheets and reversely along said predetermined path, means for heating said sealing elements for a timed interval and then terminating such heating while elements are in engagement with said sheets, and means for cooling said elements and solidifying the sheets upon termination of the heating.

9. In an apparatus for heat sealing sheets of heat-sealable material moving along a predetermined path, the combination of, a sealing bar disposed on one side of said path, a sealing element on the side of said seal bar adjacent said path, means supporting said sealing bar for movement toward said path to press said element against the adjacent sheet, then along said path with the sheets, and then away from the path to release the sheets, means for heating said element for a limited period of time while the element is moving along said path in engagement with the adjacent sheet thereby to melt areas of the sheets and fuse them together, and means on said sealing bar for cooling said element immediately after the sheets are melted to solidify the sealed areas of the sheets.

10. The combination defined in claim 9 further including a second sealing bar having a second sealing element opposing the first sealing element, said second bar being supported for movement similar to the movement of said first bar to move said elements toward each other and against the sheets, then along said path with the sheets, and then away from the path.

11. The combination defined in claim 10 in which said cooling means include conduits for carrying a flow of coolant along to said elements to remove heat therefrom.

12. The combination defined in claim 9 in which said sealing elements are strips of resistance heating material, and said heating means include electrical circuit elements for passing an energizing current through the strips for a predetermined time interval.

13. The combination defined in claim 12 in which the adjacent faces of said bars are formed with recesses for receiving said sheets, said sealing elements being disposed in said recesses and spaced apart, when the bars are together, a distance less than the normal thickness of said sheets.

References Cited

UNITED STATES PATENTS

| | | | |
|---|---|---|---|
| 2,542,901 | 2/1951 | Chaffee | 156—498 |
| 3,119,920 | 1/1964 | Mayhew | 156—583 |
| 3,140,218 | 7/1964 | Hannon | 156—583 |

DOUGLAS J. DRUMMOND, Primary Examiner

U.S. Cl. X.R.

156—583